(12) United States Patent
Cornelius

(10) Patent No.: US 9,435,377 B2
(45) Date of Patent: Sep. 6, 2016

(54) HIGH-CAPACITY BEARING

(76) Inventor: Charles C. Cornelius, Kirkland, WA (US)

( * ) Notice: Subject to any disclaimer, the term of this patent is extended or adjusted under 35 U.S.C. 154(b) by 89 days.

(21) Appl. No.: 14/110,852

(22) PCT Filed: May 17, 2012

(86) PCT No.: PCT/US2012/038445
§ 371 (c)(1),
(2), (4) Date: Nov. 25, 2013

(87) PCT Pub. No.: WO2012/158974
PCT Pub. Date: Nov. 22, 2012

(65) Prior Publication Data
US 2014/0301686 A1 Oct. 9, 2014

Related U.S. Application Data

(60) Provisional application No. 61/486,916, filed on May 17, 2011.

(51) Int. Cl.
| | |
|---|---|
| *F16C 33/58* | (2006.01) |
| *F16C 33/36* | (2006.01) |
| *F16C 19/36* | (2006.01) |
| *F16C 33/46* | (2006.01) |
| *F16C 33/52* | (2006.01) |
| *F16C 33/60* | (2006.01) |

(52) U.S. Cl.
CPC ............... *F16C 33/58* (2013.01); *F16C 19/36* (2013.01); *F16C 33/363* (2013.01); *F16C 33/4605* (2013.01); *F16C 33/4623* (2013.01); *F16C 33/52* (2013.01); *F16C 33/585* (2013.01); *F16C 33/60* (2013.01); *F16C 2300/00* (2013.01)

(58) Field of Classification Search
CPC ...... F16C 33/363; F16C 33/46; F16C 33/58; F16C 33/583; F16C 33/60; F16C 35/04; F16C 35/67
USPC ....... 384/499, 502, 550, 552, 565, 569, 572, 384/618, 621–624; 74/424.92
See application file for complete search history.

(56) References Cited

U.S. PATENT DOCUMENTS

| | | | | |
|---|---|---|---|---|
| 1,930,190 | A | * | 10/1933 | Becker .................... F16C 33/34 384/459 |
| 2,251,555 | A | * | 8/1941 | Schermer ................ F16C 33/36 384/565 |
| 2,266,888 | A | * | 12/1941 | McCurdy ................ F16C 19/36 384/550 |

(Continued)

FOREIGN PATENT DOCUMENTS

JP 2007120659 A * 5/2007
JP 2011074982 A * 4/2011

*Primary Examiner* — Marcus Charles
(74) *Attorney, Agent, or Firm* — Dean A. Craine

(57) ABSTRACT

A high load capacity bearing that includes a cylindrical outer sleeve that fits around a separable cylindrical outer race assembly. The outer race assembly includes a set of non-helical grooves formed on its inside surface that mesh and engage teeth formed on the outside surface of a plurality of rotating rollers that are longitudinally and axially aligned inside the outer race assembly. The rollers are longitudinally aligned and evenly space apart and rotated as a unit inside the outer race assembly. Located inside the rollers is an inner race with non-helical grooves formed on its outside surface that mesh and engage the teeth on the rollers. The inner race includes a smooth inside bore that fits around the support surface on a shaft.

9 Claims, 14 Drawing Sheets

(56) References Cited

U.S. PATENT DOCUMENTS

| | | | | |
|---|---|---|---|---|
| 2,682,435 A * | 6/1954 | Rien | .................... | F16C 33/60 384/562 |
| 3,734,584 A * | 5/1973 | Studer | .................... | F16C 19/36 384/565 |
| 3,963,286 A * | 6/1976 | Stanley | .................... | F16C 19/36 384/550 |
| 4,040,689 A * | 8/1977 | Stanley | .................... | F16C 19/36 384/550 |
| 5,370,012 A * | 12/1994 | Stanley | .............. | F16H 25/2252 74/424.92 |
| 5,853,294 A * | 12/1998 | Rehder | ................ | H01R 39/643 439/17 |
| 6,015,238 A * | 1/2000 | Zernickel | ................ | F16C 19/36 384/455 |
| 6,149,312 A * | 11/2000 | Druet | ...................... | F16C 19/36 384/550 |
| 6,158,558 A * | 12/2000 | Bill | ........................ | F16D 65/18 188/162 |
| 6,318,516 B1 * | 11/2001 | Zernickel | .............. | B60T 13/741 188/157 |
| 8,220,132 B2 * | 7/2012 | Kinoshita | ........... | F16H 25/2252 29/466 |
| 2004/0244520 A1 * | 12/2004 | Cornelius | ........... | F16H 25/2252 74/424.92 |
| 2005/0160856 A1 * | 7/2005 | Sugitani | .............. | F16H 25/2252 74/424.92 |
| 2009/0003750 A1 * | 1/2009 | Chen | .................... | F16D 41/067 384/572 |
| 2010/0269616 A1 * | 10/2010 | Merlet | ............... | F16H 57/0497 74/424.92 |

\* cited by examiner

HIGH-CAPACITY BEARING

BACKGROUND OF THE INVENTION

1. Field of the Invention

The present invention relates generally to bearings and more particularly bearings specifically designed for high loads.

2. Description of the Related Art

Bearings 5 found in the prior art shown in FIGS. 1 and 2 commonly consist of stacked pairs of ball bearings 6 mounted on a support shaft 7. The bearing may mount or attached to a cavity or support surface formed on a part 9. The load capacity of the ball bearings 6 is dependent on the number of ball bearings 6 stacked together, and the size and number of balls 8. Generally, the larger number of ball bearings 6 stacked together, and the larger the size and number of balls 8 used, the larger is the load capacity of the bearing 5. Unfortunately, in environments where large load capacity is needed, the bearing 5 must be relative large and the shaft and housing must be relatively large.

The load capacity of a bearing 5 is determined by the size and number of contact points 11, 12 between the balls 8 and the bearing's inside and outside races 9 and 10, respectively. The size and number of balls 8 and the sizes of the races 9, 10 are often limited by the environment or machine where the bearing 5 is used. In environments where the load capacity is near or slightly lower than the maximum load capacity of the bearing 5, the bearings 5 frequently wear out and must be replaced.

SUMMARY OF THE INVENTION

It is an object of the present invention to provide a bearing that has a relatively high load capacity.

It is an object of the present invention to provide a bearing that is relatively small and compact and has a relatively long life span.

It is another object of the present invention to provide such a bearing that can be used in place of a single or multiple bearings used in the prior art.

Disclosed herein is a compact bearing with increased contact areas between opposing structures located inside the bearing that substantially increases the bearing's load capacity and increases the bearing's life span. The bearing is specifically designed so that it may be easily assembled.

More specifically, the bearing includes a plurality of small diameter rollers axially and radially aligned therein. The rollers include a plurality of non-helical teeth that simultaneously engage compatible-shaped, non-helical grooves formed on the inside surface of an outer race assembly. In the embodiment presented herein, the outer race assembly is a cylindrical structure made of two half cylindrical sections that are joined together. When the two half cylindrical sections are joined to form a complete cylindrical structure, a cylindrical outer sleeve is positioned around the two half cylindrical sections to hold them tightly together. The two half sections include non-helical grooves that when tightly joined together, form continuous, circular aligned non-helical grooves on the inside surface of the outer race assembly.

The rollers are part of a roller assembly portioned longitudinally inside the bearing. The roller assembly includes a means for holding a plurality of longitudinally and axially aligned rollers inside the outer race assembly. Each roller includes a plurality of non-helical teeth configured to mesh and engage the non-helical grooves formed on the outer race assembly. The roller assembly includes a rotating support structure that holds the rollers longitudinally in a fixed position inside the bearing and hold the rollers in an equally spaced, radially aligned position. The rotating support structure may be two alignment rings or a cylindrical cage.

In one embodiment, a cylindrical inner race is disposed over the shaft and inside the roller assembly. The inner race includes a plurality of non-helical grooves configured to engage the teeth on the rollers. During assembly, the inner race is mounted and locked in position on a bearing support surface on the shaft.

The roller assembly is disposed inside a gap formed between the outer race assembly and an inner race or the shaft. The inner race is a cylindrical with a smooth center bore and a plurality of non-helical grooves designed to mesh with the teeth on the rollers. The rollers are circumferentially aligned around the inner race and fit inside the raceway and against the inner race and the outer race assembly. Each roller has a sufficient diameter and length so that the non-helical teeth simultaneously mesh with the non-helical grooves formed on the outer race assembly and the inner race.

After assembly, the bearing is placed on the bearing support surface on the shaft. In one embodiment, the shaft includes an abutment surface and external threads that extend outside the bearing. A nut is attached to the threads on the shaft which squeezes the inner race against the abutment surface to fix the inner race onto the shaft. Also during assembly, the outer sleeve and outer race assembly are mounted on a fixed location on a support surface or cavity located on a desired part. The rotation of the roller assembly and the rotation of the individual rollers between the outer race assembly and the inner race, the enable shaft and part to rotate and transfer load forces therebetween.

In one embodiment, the inner race is eliminated and a modified shaft is used that includes a bearing support surface region with the second set of non-helical grooves that are identical in shape and size to the first set of non-helical grooves formed on the outer race assembly and configured to mesh with the teeth on the rollers. During use, the non-helical teeth on the rollers mesh with the non-helical grooves formed on the outer race assembly and on the shaft. In this embodiment, the abutment edge on the shaft and the nut may be eliminated.

In another embodiment, a modified two part outer sleeve and a modified outer race assembly are used so that forces exerted between the shaft and the outer race assembly do not cause the outer sleeve to be removed from the outer sleeve assembly. The outer sleeve includes two outer sleeve sections that are placed over the opposite ends of the outer race assembly to hold the two outer sleeve sections together. A gap is formed between the two outer sleeve sections. The modified outer race assembly includes an outward extending circular collar that fits into a gap formed between an outer sleeve made up of two outer sleeve sections.

DESCRIPTION OF THE PREFERRED EMBODIMENT(S)

Figure 1:
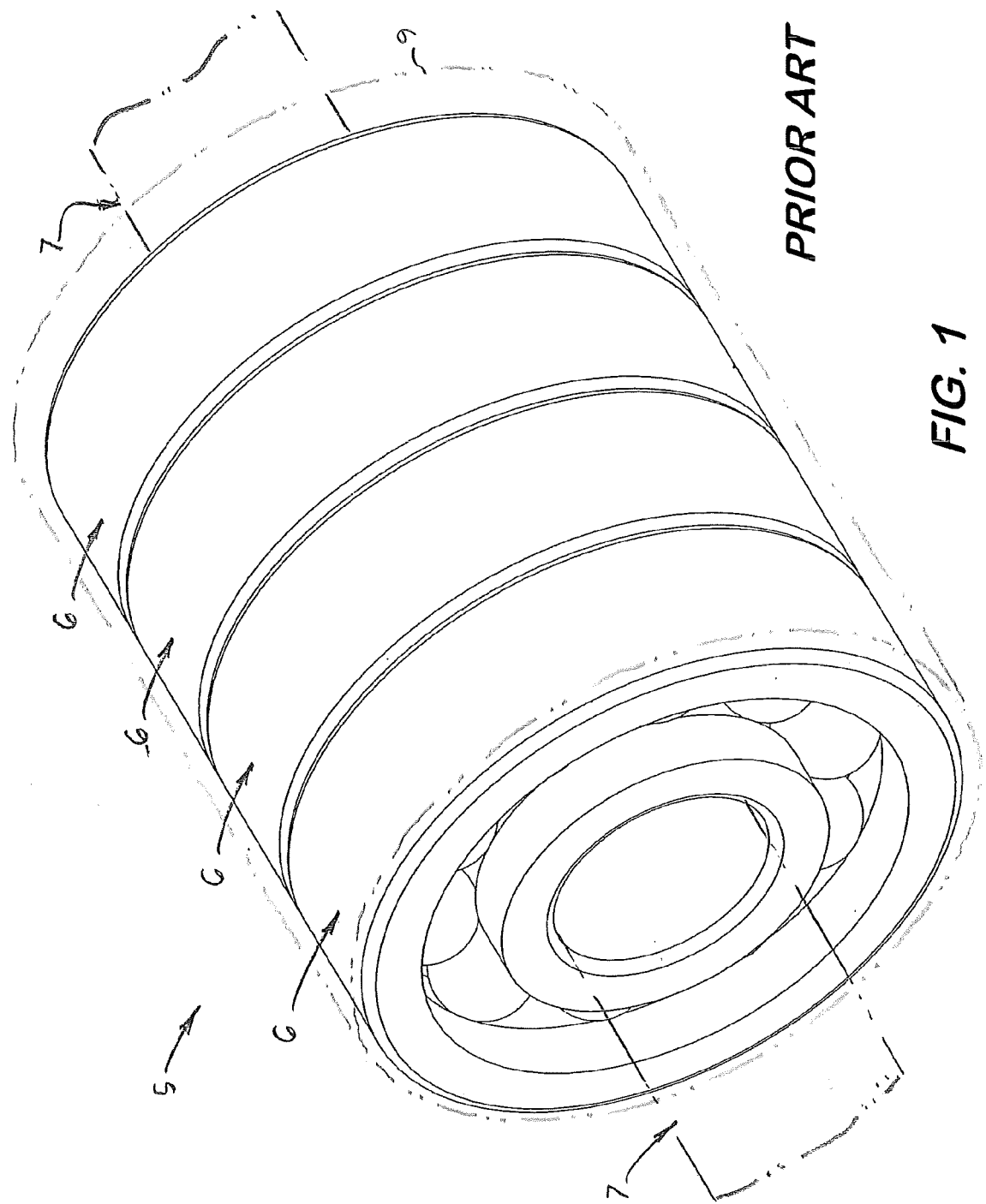
FIG. 1 is a perspective view of two duplex ball bearing sets used in the prior art.
Figure 2:
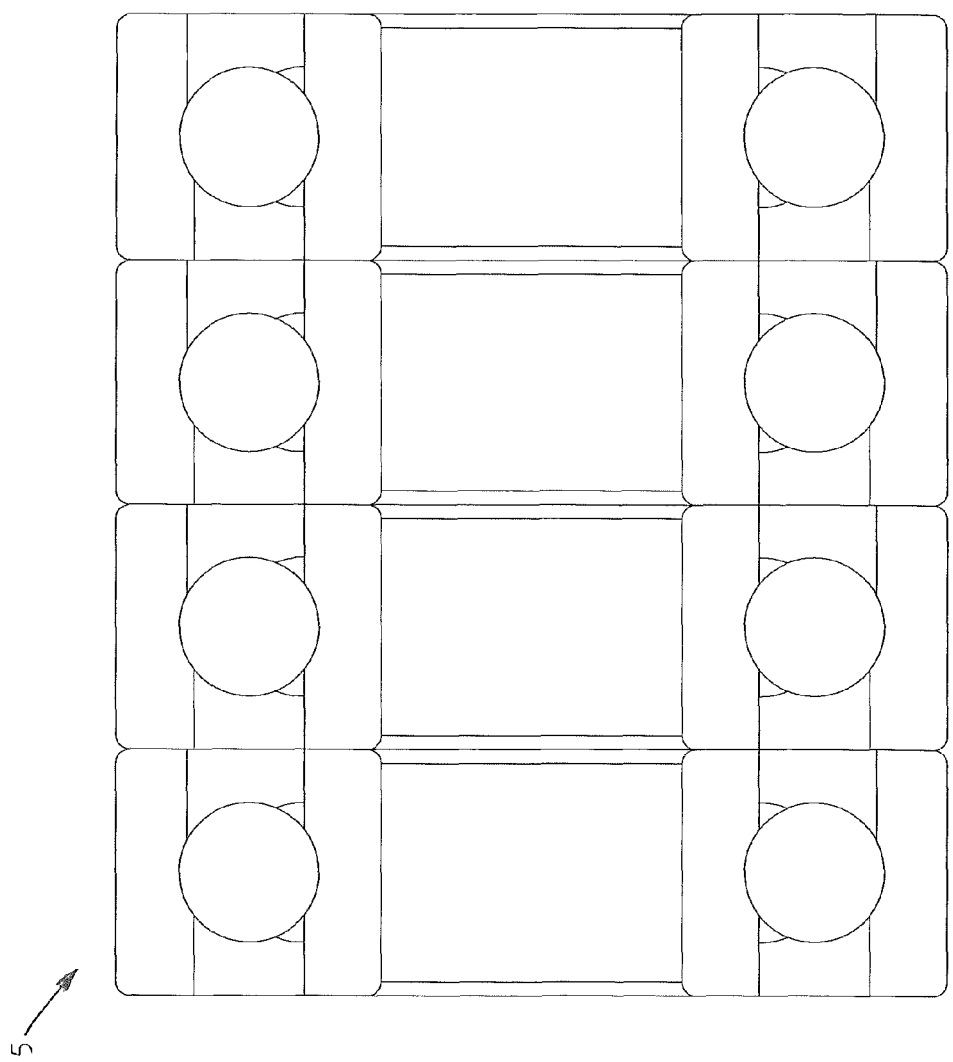
FIG. 2 is a sectional side elevational view of the two ball bearing sets shown in FIG. 1.
Figure 3:
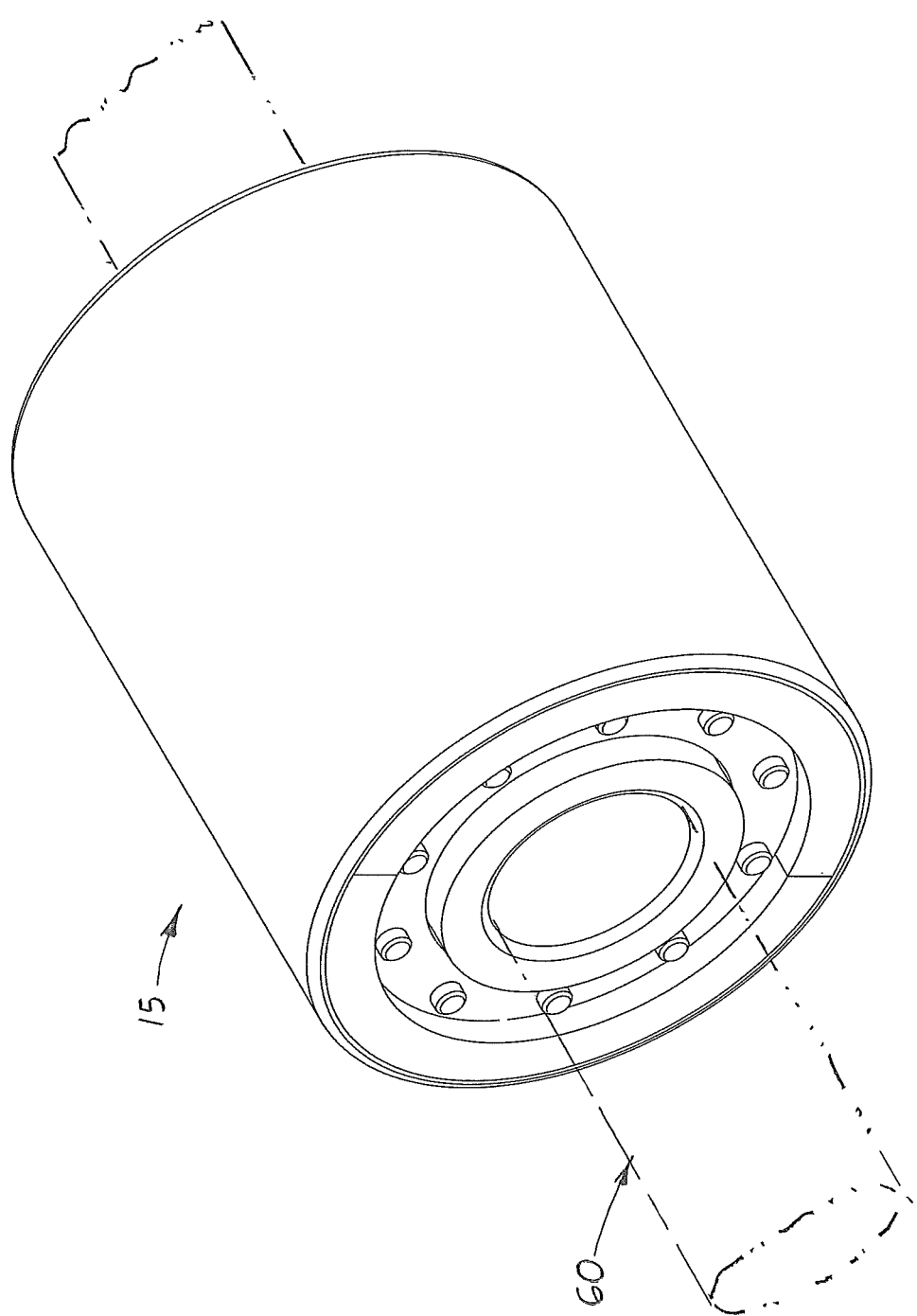
FIG. 3 is a perspective view of the high capacity bearing disclosed herein and mounted on a shaft.

Referring to the FIG. 3, there is shown a high load capacity bearing 15 mounted on a shaft 60 that has greater internally opposing contact areas that substantially increases the bearing's overall capacity and its life span. The increased capacity is created by using intermediate structures inside the bearing 15 that spread the load over substantially large areas. The structures are also compact enabling the overall size and shape of the bearing 15 to be relatively small and compact.

Figure 4:
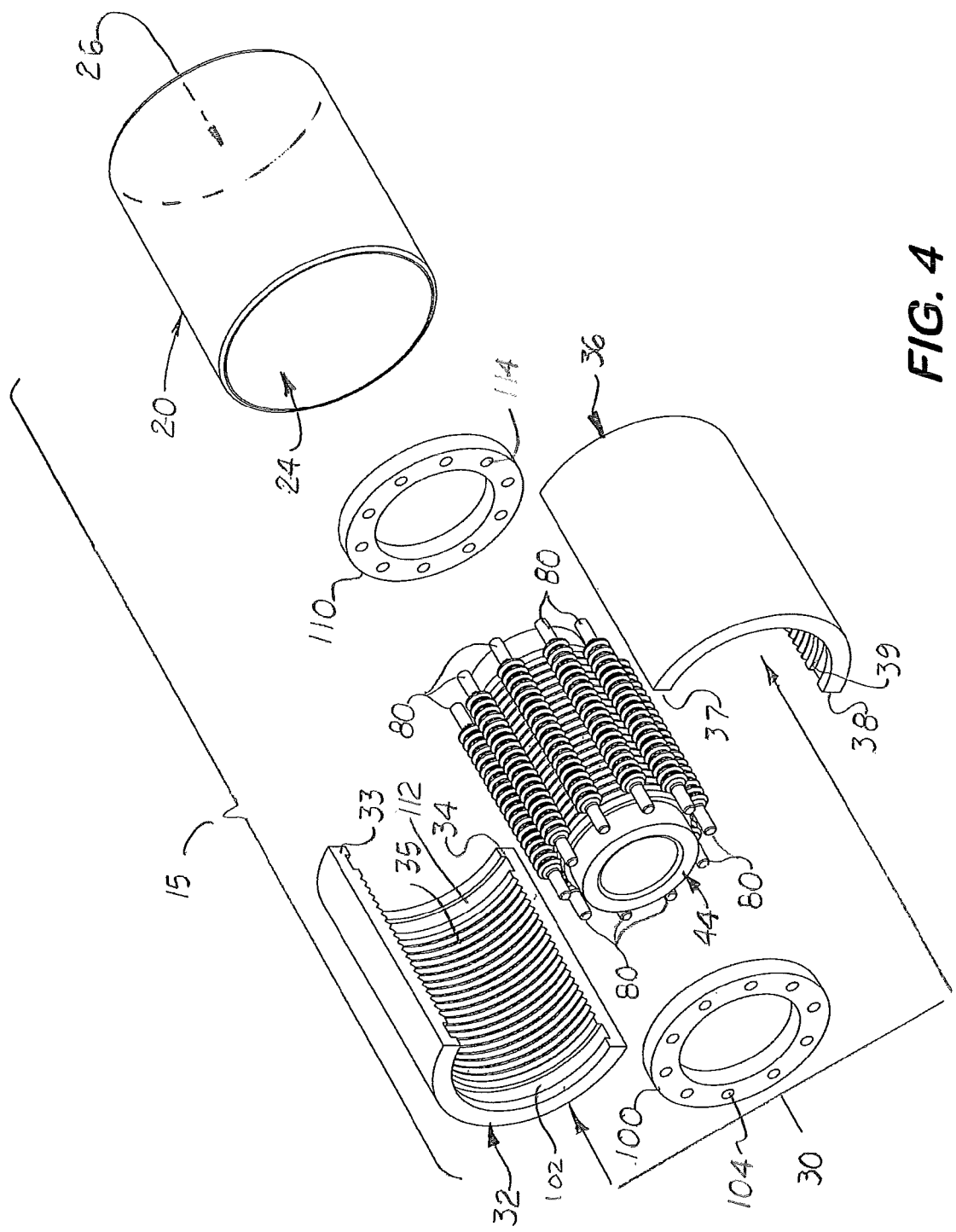
FIG. 4 is an exploded, perspective view of the invention shown in FIG. 3.

Referring to FIG. 4, the bearing 15 includes an outer race assembly 30 made of two half cylindrical sections 32, 36. In the embodiment shown, the half cylindrical sections 32, 36 are identical in shape and size each with two planar, longitudinally aligned abutment edges 33, 34 and 37, 38, respectively that enable the two half cylindrical sections 32, 36 to be closed tightly to form a complete cylindrical outer race assembly 30. During assembly, a cylindrical outer sleeve 20 slides over the two half cylindrical sections 32, 36 to hold them tightly together. In the embodiment shown, outer sleeve 20 includes two open ends 24, 26.

Formed on the inside surface of each half cylindrical section 32, 36 is a plurality of semi-circular non-helical grooves 35, 39, respectively. When the two sections 32, 36 are joined together to form the cylindrical outer race assembly 30, the grooves 35, 39 on the two outer sleeve sections 32, 36 are aligned so that they form a continuous set of non-helical grooves (denoted 40) on the inside surface of the outer race assembly 30.

Figure 5:
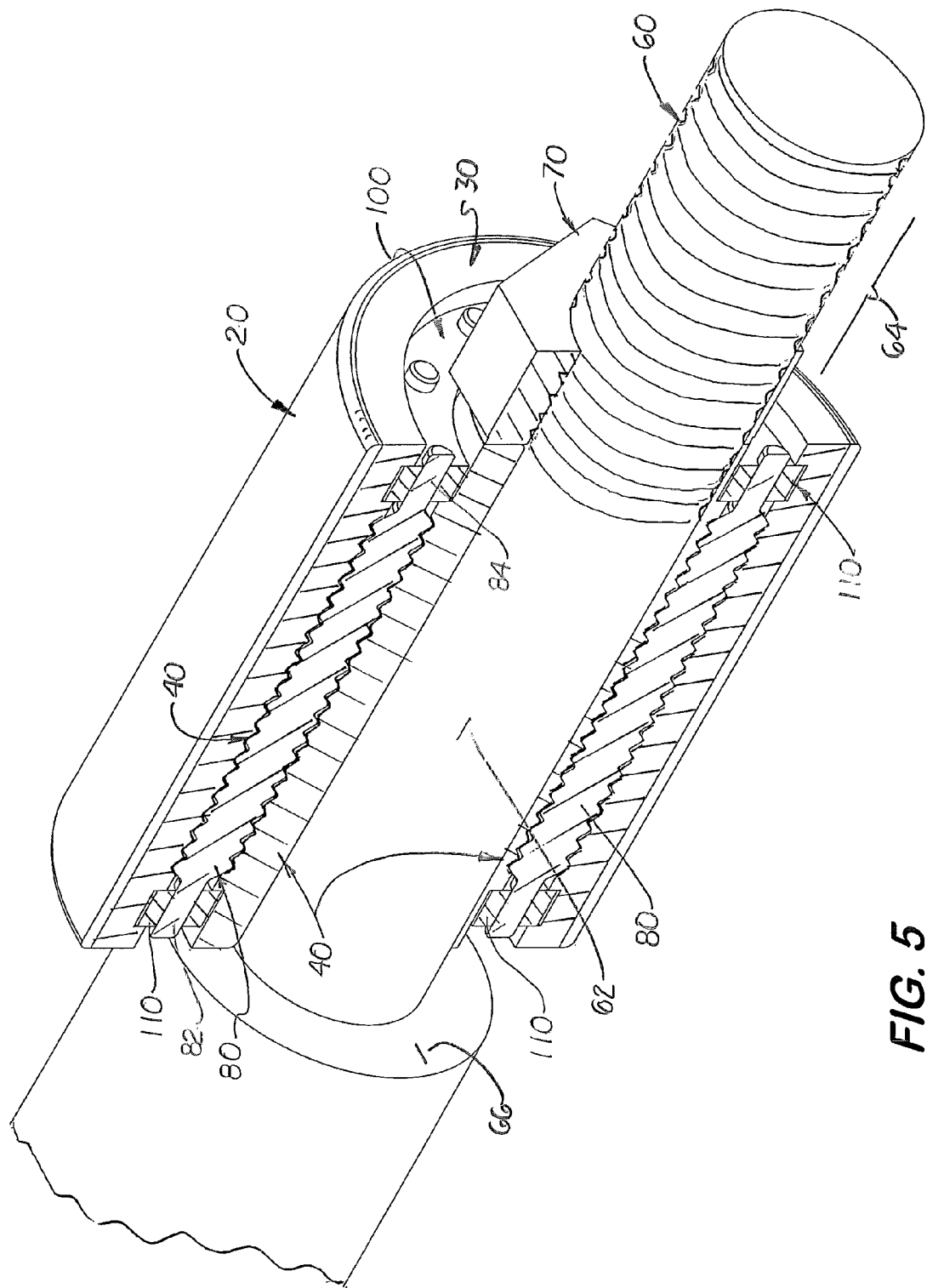
FIG. 5 is a partial sectional, perspective view of the first embodiment of the bearing that uses an inner race that is engaged by the rollers.
Figure 6:
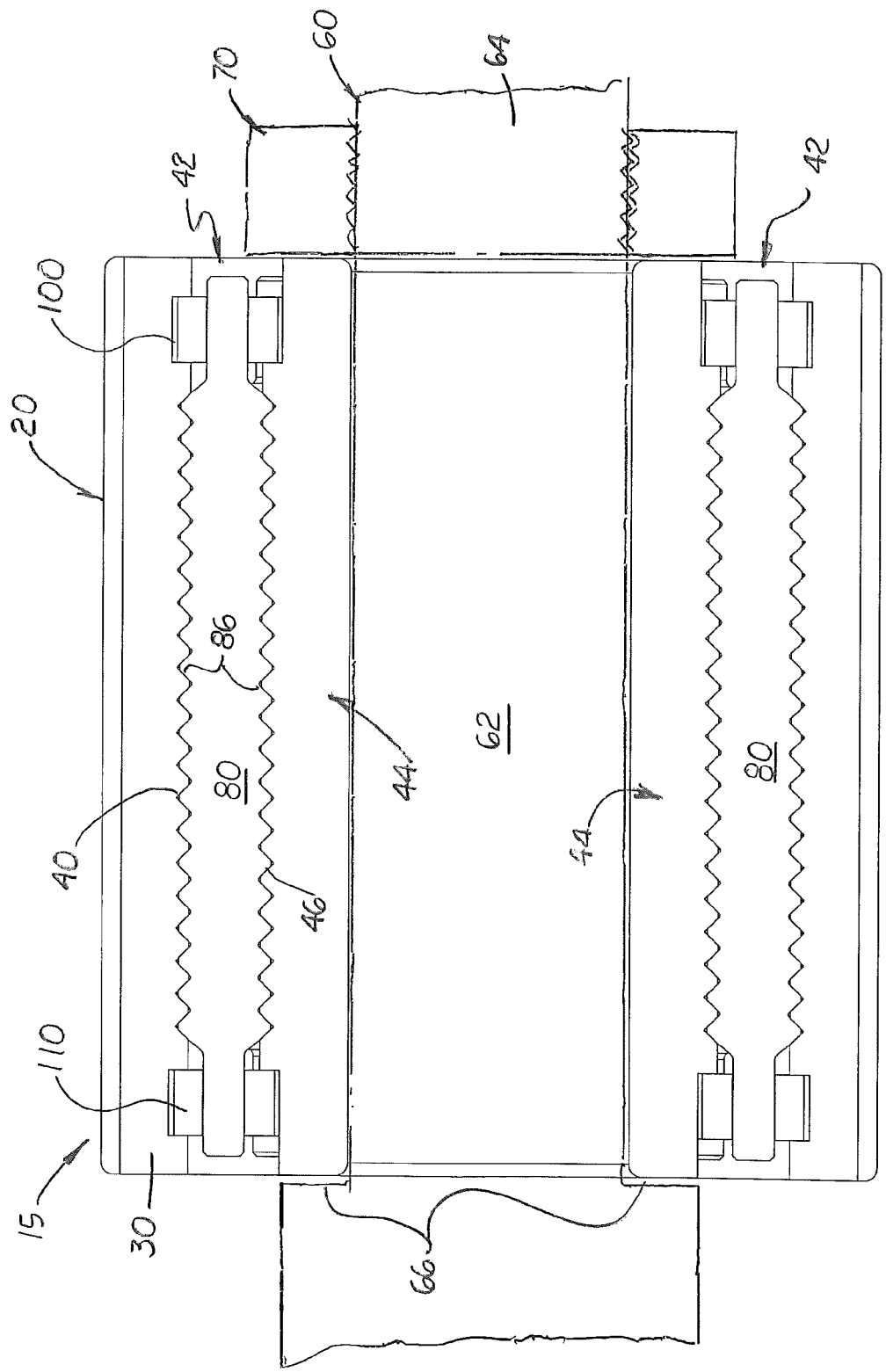
FIG. 6 is a sectional, side elevational view of the bearing shown in FIGS. 4 and 5.

In a first embodiment shown in FIGS. 4-5, the bearing 15 includes a small diameter, cylindrical inner race 44 is coaxially aligned and located inside the outer race assembly 30. As shown in FIG. 6, a circular gap or raceway 42 is formed between the inside surface of the outer race assembly 30 and the outside surface of the inner race 44. Formed on the outside surface of the inner race 44 is a second set of non-helical grooves 46 that are aligned with and compatible in number, size and shape to the first set of non-helical grooves 40 formed on the outer race assembly 30.

Disposed inside the raceway 42 is a roller assembly that includes a plurality of longitudinally aligned rollers 80. The rollers 80 are circumferentially aligned around the inner race 44 and fit inside the raceway 42 and against the grooves formed on outer race assembly 30 and the inner race 44. Each roller 80 includes a set of non-helical teeth 86 that are similar in shape and size to the sets of non-helical grooves 40, 46 formed on the outer race assembly 30 and on the inner race 44, respectively. Each roller 80 has a sufficient diameter and length so that the non-helical teeth 86 formed thereon simultaneously mesh with the non-helical grooves 40, 46 on the outer race assembly 30 and the inner race 44, respectively. The rollers 80 are offset so that the tips and valleys of the non-helical teeth 86 fits within the non-helical grooves 40, 46 formed on the outer race 30 and the inner race 44, respectively.

In the first embodiment, the inner race 44 mounts to a smooth bearing support area 62 formed on the shaft 60 as shown in FIGS. 5 and 6. The shaft 60 also includes a threaded end section 64. Formed or attached to the shaft 60 adjacent to the bearing support area 62 is an abutment edge 66 which prevents longitudinal movement of the bearing 15 over the shaft 60. When the bearing 15 is attached to the shaft 60, the threaded end section 64 is exposed and receives a threaded nut 70 that when tightened against the end of the thrust bearing 15 and presses against the inner race 44 to hold it in place on the shaft 60. It should be understood that the threaded nut 70 could be replaced with another structure that holds the inner race 44 in place on the shaft 60.

Figure 7:
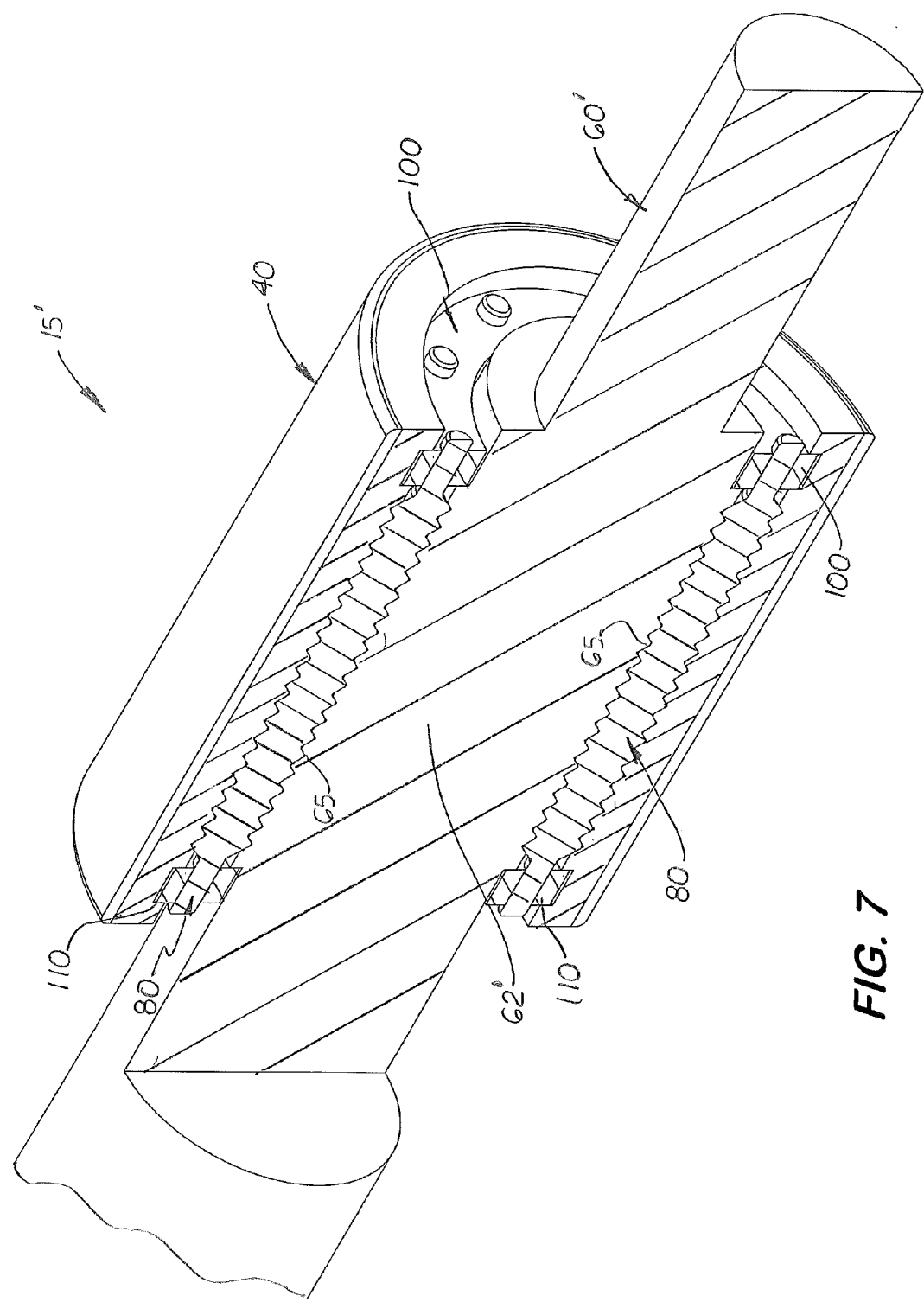
FIG. 7 is a partial sectional, perspective view of the second embodiment of the bearing in which the modified shaft with non-helical grooves formed thereon that eliminates the need for an inner race with non-helical grooves.
Figure 8:
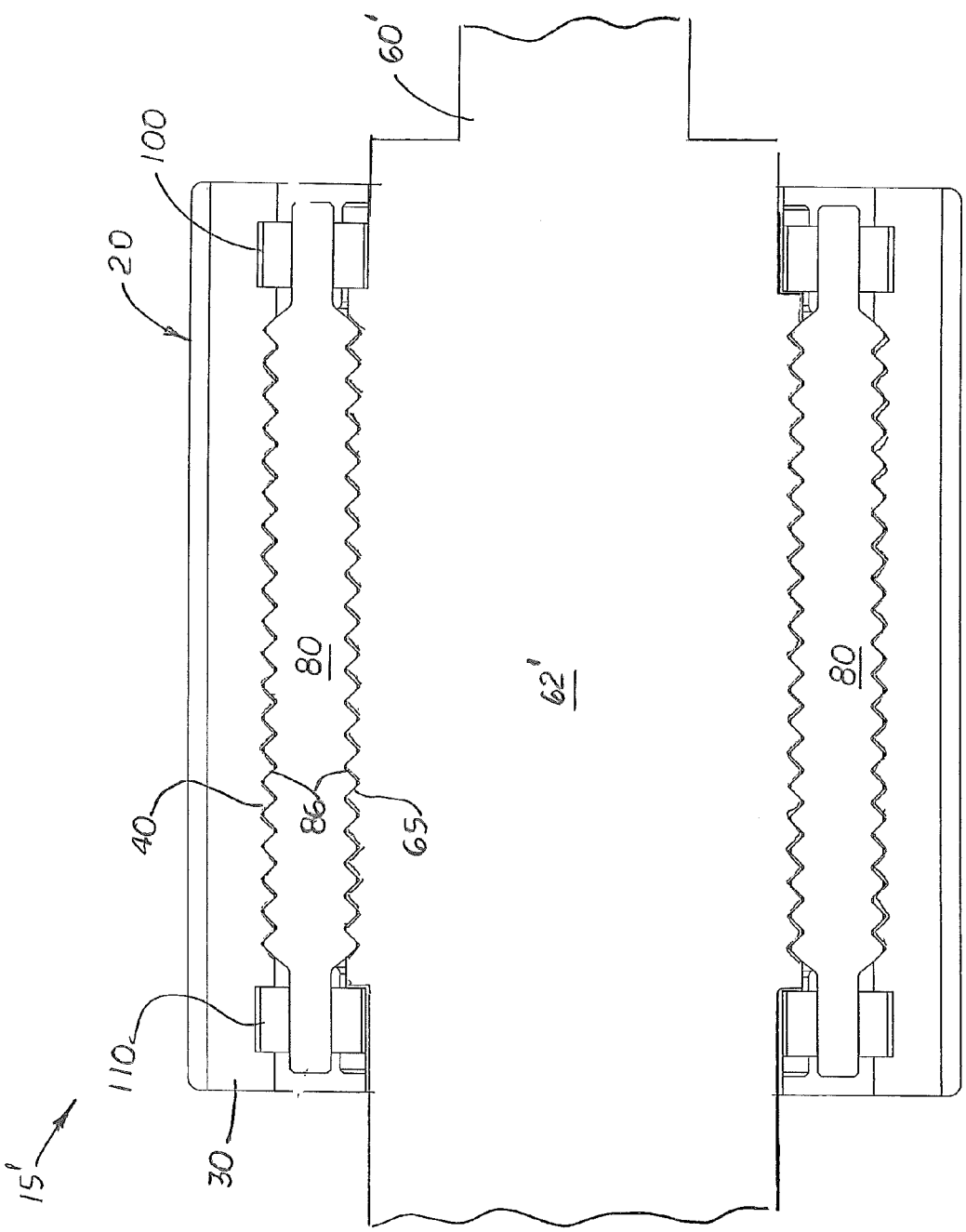
FIG. 8 is a sectional, side elevational view of the bearing shown in FIG. 7.

FIGS. 7 and 8 show a second embodiment of the bearing, denoted 15', in which the inner race 44 used in the first embodiment is eliminated and a modified shaft 60' is used in place of the first shaft 60. The modified shaft 60' includes a bearing support region 62' with the second set of non-helical grooves 65 formed thereon that are compatible in shaped and size to the set of non-helical grooves 40 formed on the outer race assembly 30. During use, the non-helical teeth 86 on the rollers 80 mesh with the non-helical grooves 40, 65 formed on the outer race assembly 30 and on the shaft 60', respectively. Because a set of non-helical grooves 65 are formed on the shaft 60', the abutment edge 66 and the locking nut 70 shown in FIGS. 5 and 6 may be eliminated.

Each roller 80 has a sufficient diameter and length so that the non-helical teeth 86 formed thereon simultaneously mesh with the non-helical grooves 40, 46, or 65 on the outer race 30, the inner race 44 or the shaft 60, respectively. Extending around the shaft 60 and positioned inside each end of the outer sleeve assembly 30 are two alignment rings 100, 110. The alignment rings 100, 110 fits into are restrained by grooves 102, 112 formed on the inside surface of the outer race assembly 30. The grooves 102, 112 prevent longitudinal movement of the alignment rings 100, 110 and hold them circumferentially and coaxially over the shaft. The grooves 102, 112 also allow the alignment rings 100, 110 to rotate freely therein. During operation, the alignment rings 100, 110 rotate which allows the rollers 80 together as a single unit. Each roller 80 includes two longitudinal aligned arms 82, 84 that during assembly, are inserted into compatible holes 104, 114, formed on the two alignment rings 100, 110, respectively, that allows the rollers 80 to independently rotated on the alignment rings 100, 110.

During operation, the bearing 15 or 15' may be attached or coupled to a moving or stationary structure and the shaft 60 or 60' may rotate freely and continuously inside the thrust bearing 15, 15'. The load exerted from the structure to the shaft 60 is spread across all of the contact surfaces between the roller teeth and the race grooves thereby enabling the thrust bearing to be used with greater loads.

Figure 9:
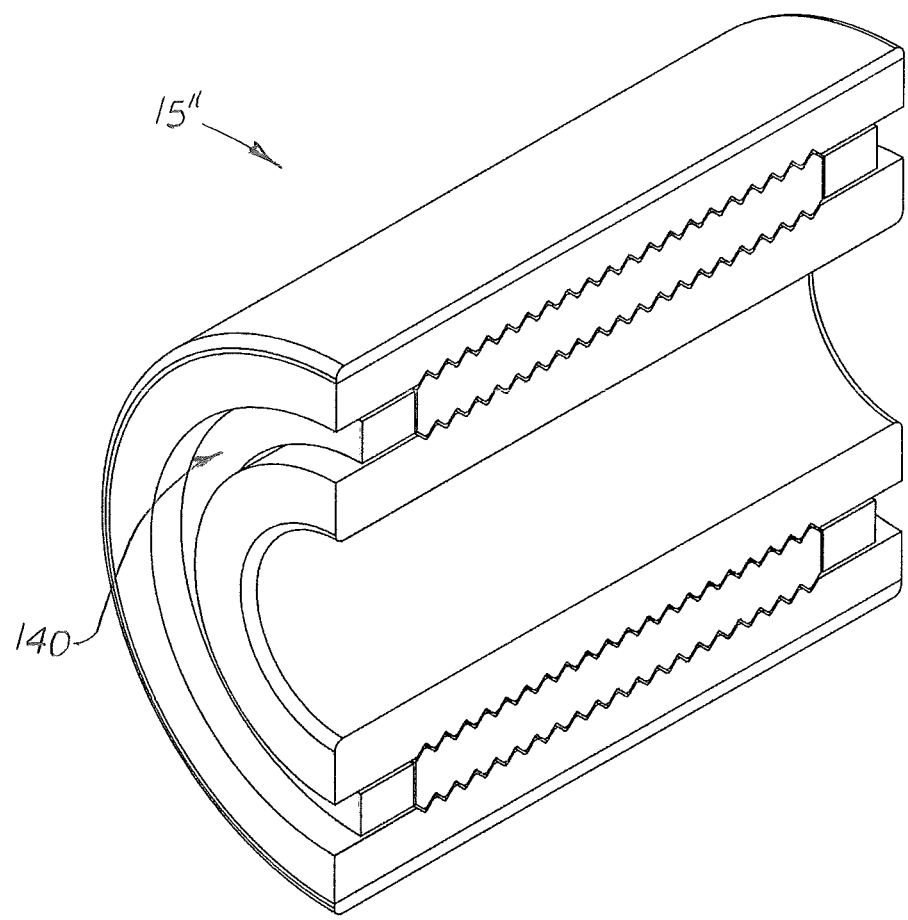
FIG. 9 is a sectional, perspective view of another embodiment of the bearing showing the two alignment rings being replaced by a cylindrical cage.
Figure 10:
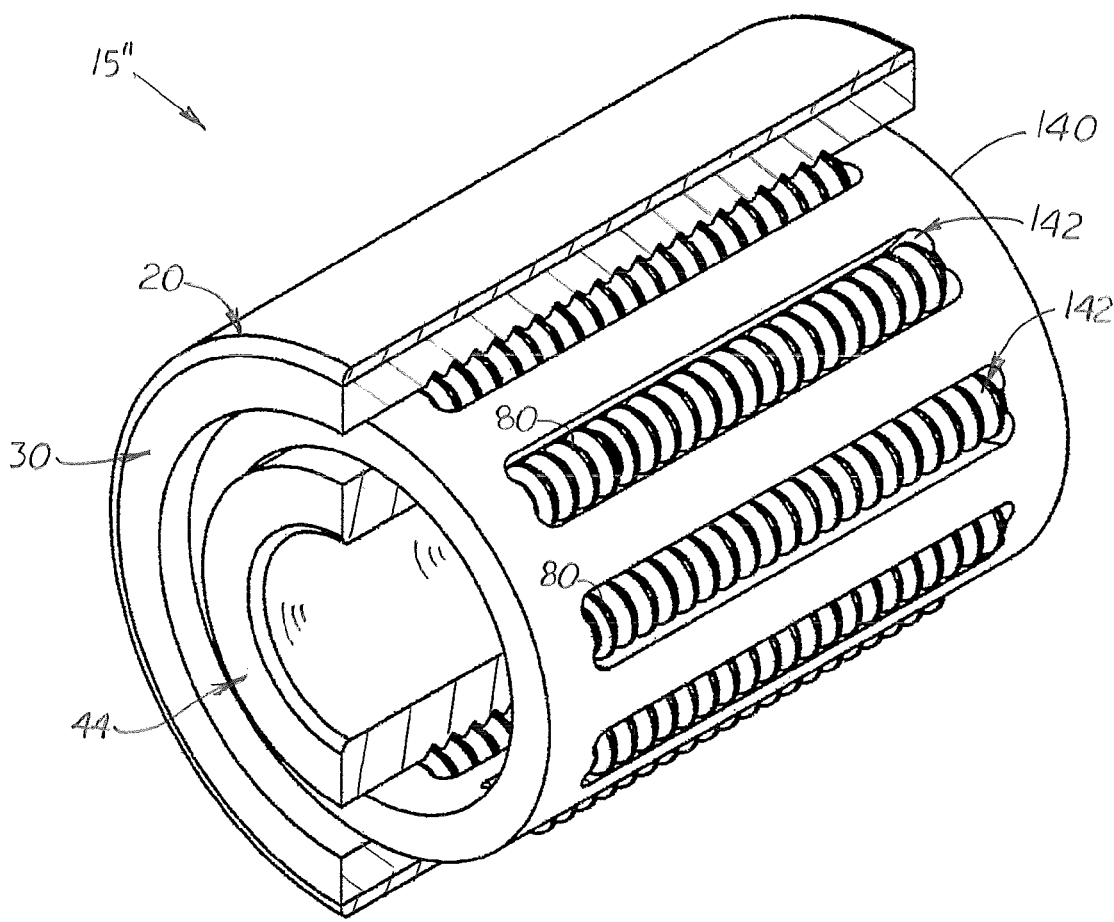
FIG. 10 is a sectional, perspective view of bearing shown in FIG. 9 showing the rollers disposed in elongated slots formed on the cylindrical cage.

FIGS. 9 and 10 are sectional, perspective views of another embodiment of the bearing 15" showing the two alignment rings being replaced by a single cylindrical cage 140. The cylindrical cage 140 includes a plurality of axially aligned slots 142 configured to hold a longitudinally aligned roller 80 therein.

Figure 11:
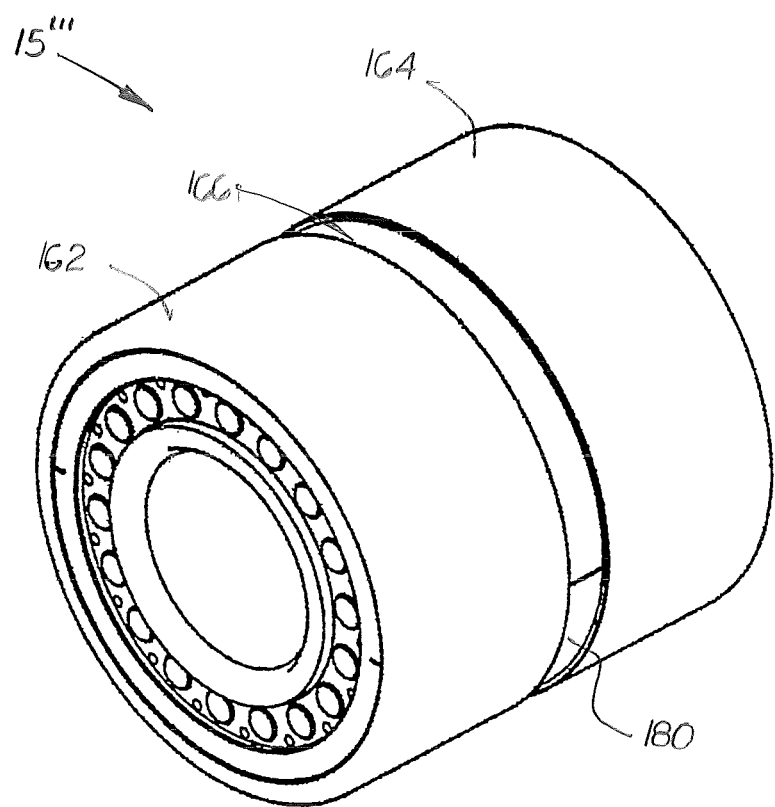
FIG. 11 is a perspective view of another embodiment of the invention that includes an outer race assembly with a semi-circular collar formed on each outer race section that forms a circular collar that fits into a gap formed between two shorter outer sleeves.

FIG. 11 is a perspective view of another embodiment of the bearing 15''' that includes an outer race assembly made of two outer race sections each with an outward extending, semi-circular collar. When assembled, the two collars form a circular collar that fits into a gap formed between two shorter outer sleeve sections that after assembly form the outer sleeve. The reason for forming a circular collar that fits into a gap formed between the two outer sleeves is to transfer the longitudinal forces exerted by the rollers on the outer sleeve onto one of the outer sleeves. When used with different mating parts, the abutment edges on the mating part may very. By using the collar and gap and the two outer sleeves, that longitudinal forces exerted by the rollers may be transferred to the lateral edges of the outer sleeve.

Figure 12:
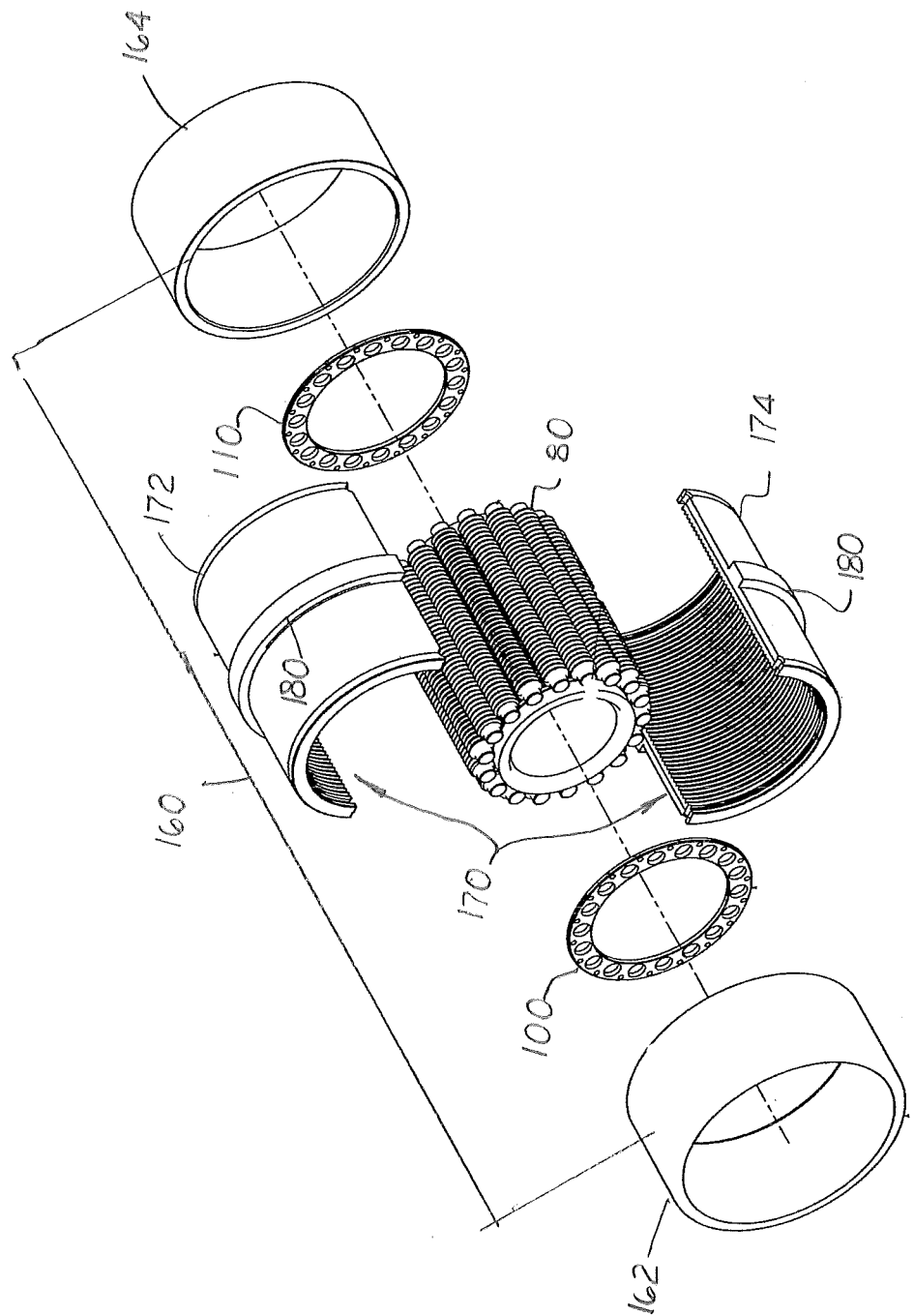
FIG. 12 is an exploded, perspective view of the embodiment of the invention shown in FIG. 11.

FIG. 12 is an exploded, perspective view of the embodiment of the bearing 15' shown in FIG. 11.

Figure 13:
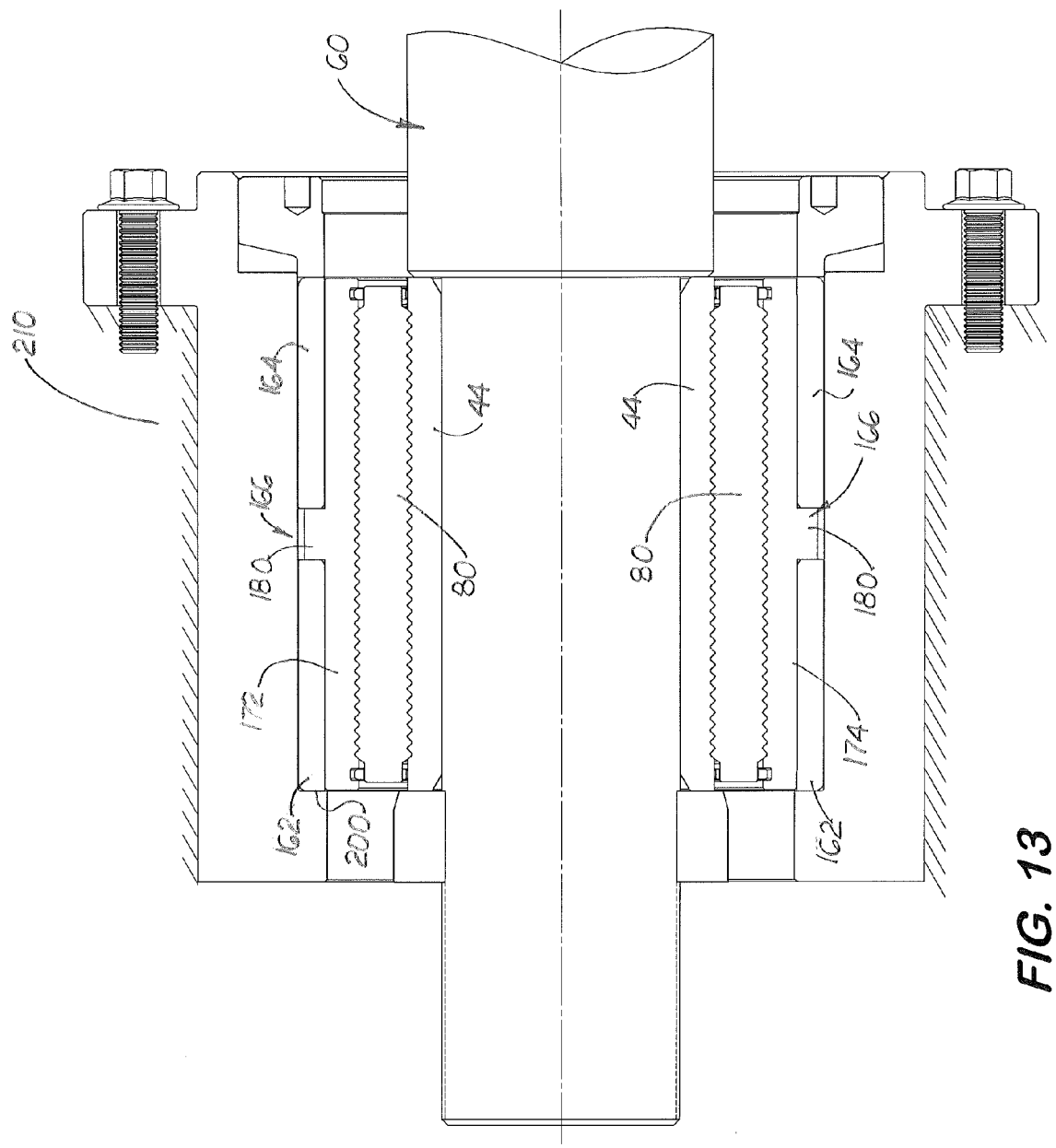
FIG. 13 is an illustration showing a modified two part outer sleeve and a modified outer race assembly are used so that forces exerted between the shaft and the outer race assembly do not cause the outer sleeve to be removed from the outer sleeve assembly.

In another embodiment, shown in FIG. 13, a modified two part outer sleeve and a modified outer race assembly are used so that forces exerted between the shaft and the outer race assembly do not cause the outer sleeve to be removed from the outer sleeve assembly. The outer sleeve 160 includes two outer sleeve sections 162, 164 that are placed over the opposite ends of the outer race assembly 170 to hold the two outer sleeve sections 162, 164 together. A gap 166 is formed between the two outer sleeve sections 162, 164. The modified outer race assembly 170 includes an outward extending circular collar 180 that fits into a gap 166 formed between an outer sleeve sections 162, 164.

Figure 14:
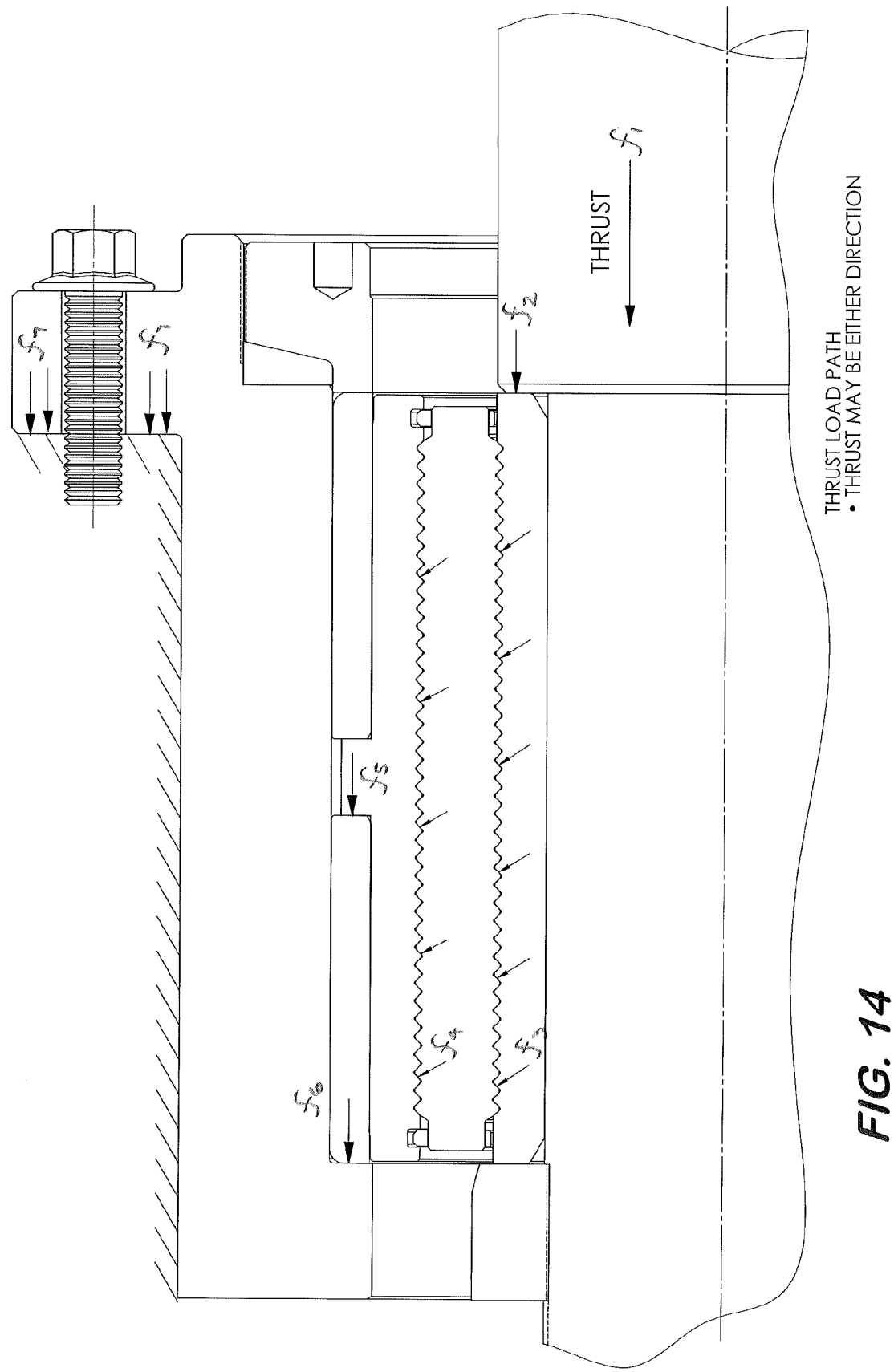
FIG. 14 is an illustration showing how the net thrust force exerted on the shaft are transferred through the bearing with the modified two part outer sleeve and the modified outer race assembly.

FIG. 14 is an illustration showing how the net thrust force f(1) exerted on the shaft creates a force f(2) that is exerted against the end of the inner race. The forces f(3) on the inner race are then transferred from the non-helical grooves on the inner race to the lower teeth on the roller. The force f(4) is then exerted from the upper teeth of the roller to the outer race assembly. The collar then exerts a force f(5) against the edge of the outer sleeve which in turn exerts a force against an abutment edge on the part. The forces f(6) on the part are then exerted on the machinery or ground.

INDUSTRIAL APPLICABILITY

This invention is useful in industries that use bearings that are carry high capacity loads that susceptible wear or breakage.

In compliance with the statute, the invention described herein has been described in language more or less specific as to structural features. It should be understood, however, that the invention is not limited to the specific features shown, since the means and construction shown is comprised only of the preferred embodiments for putting the invention into effect. The invention is therefore claimed in any of its forms or modifications within the legitimate and valid scope of the amended claims, appropriately interpreted in accordance with the doctrine of equivalents.

I claim:

1. A high load capacity bearing configured to be mounted on a load supporting section of a shaft with an abutment edge adjacent to said load support surface, said shaft includes external threads and a nut attached thereto that when sufficiently tightened, comprising:
   a. a cylindrical outer race assembly made of at least two outer race half cylindrical sections, each half cylindrical section includes a plurality of inward facing, non-helical grooves;
   b. a rotating roller assembly coaxially aligned and located inside said outer race assembly, said roller assembly includes a plurality of rollers that are evenly spaced apart and longitudinally with said outer race assembly, each said roller includes a plurality of non-helical teeth;
   c. a cylindrical outer sleeve disposed around said outer race assembly that holds said half cylindrical sections together around said roller assembly; and
   d. means for transferring a load force between a load support section of said shaft and said rollers including a cylindrical inner race with a center bore that slides over said shaft, said inner race includes a plurality of non-helical grooves configured to mesh with said teeth on said rollers, said inner race fixed to said shaft by said nut.

2. The bearing as recited in claim 1, a rotating cylindrical cage located inside said outer sleeve assembly with a plurality of said rollers longitudinally aligned and mounted thereon, each said roller is able to rotate freely on said cylindrical cage.

3. The bearing as recited in claim 1, further including said outer race assembly includes an outward extending collar and a gap formed on said outer sleeve, said collar transmits forces exerted on said outer race assembly from said roller assembly to said outer sleeve.

4. A high load capacity and easy to assemble bearing that is mounted on a load supporting section of a shaft, comprising:
   a. a cylindrical outer race assembly made of at least two outer race half cylindrical sections, each half cylindrical section includes a plurality of inward facing, non-helical grooves;
   b. a rotating roller assembly coaxially aligned and located inside said outer race assembly, said roller assembly includes a plurality of rollers that are evenly spaced apart and longitudinally with said outer race assembly, each said roller includes a plurality of non-helical teeth;
   c. a cylindrical outer sleeve disposed around said outer race assembly that holds said half cylindrical sections together around said roller assembly;
   d. a pair of alignment rings located inside said outer race assembly that hold said rollers in a longitudinally aligned position inside said outer race assembly, each said alignment ring fits into a groove formed on said inside surface of said outer race and configured to rotate inside said grooves; and,
   e. means for transferring a load force between a load support section of said shaft and said rollers; and
   a pair of alignment rings located inside said outer race assembly that hold said rollers in a longitudinally aligned position inside said outer race assembly, said alignment rings fit into two grooves formed on said inside surface of said outer race and are able to rotate inside said grooves.

5. A shaft mounted, high load capacity bearing, comprising:
   a. a cylindrical outer sleeve that includes an inner bore;
   b. a shaft longitudinally aligned and extending through said inner bore on said outer sleeve;
   c. a cylindrical outer race assembly located inside said inner bore on said outer sleevet, said outer race assembly being made of two outer race half cylindrical sections, each half cylindrical section includes a plurality of inward facing, non-helical grooves arcs that when said split ring components are joined to form a cylindrical outer race, a plurality of non-helical, circumferential grooves are formed;
   d. an cylindrical inner race with a center bore and an outer surface with a plurality of non-helical grooves formed thereon;
   e. a rotating roller assembly located between said outer race assembly and said inner race, said roller assembly includes a plurality of rollers longitudinally aligned outer race assembly and said inner race, each said roller includes a plurality of non-helical teeth formed thereon that simultaneously engage said non-helical grooves on said outer race assembly and said non-helical grooves on said inner race; outer race assembly and said non-helical grooves on said set of helical grooves; and,
   f. a pair of alignment rings that fit into compatible grooves formed on said outer race assembly, said alignment rings able to rotate inside said outer race assembly and said rollers extending between said alignment rings and able to rotate freely.

6. The bearing as recited in claim 5, further including said outer race assembly includes an outward extending collar and a gap formed on said outer sleeve, said collar transmits forces exerted on said outer race assembly from said roller assembly to said outer sleeve.

7. The bearing, as recited in claim 5, wherein said inner race is selectively mounted at a fixed longitudinally aligned position on said shaft.

8. A shaft mounted, high load capacity bearing, comprising:
   a. a cylindrical outer sleeve made up of two longitudinally aligned outer sleeve sections separated by a gap, each said outer sleeve sections includes an inner bore;
   b. a shaft longitudinally aligned and extending through said inner bore on said outer sleeve, said shaft includes an abutment edge, a smooth bearing receiving section, and a threaded stem;
   c. a cylindrical outer race located inside said inner bore formed by said outer sleeve sections and around said shaft, said outer race being made of at least two split ring components that include a plurality of inward facing, non-helical grooves that when said split ring components are joined to form a cylindrical outer race with a plurality of non-helical, circumferential grooves formed thereon, said outer race include an outward extend collar that fits into said gap formed between said outer sleeve sections;
   d. a cylindrical inner race located inside said outer race and adjacent to said shaft, said inner race includes an inner bore that enables said inner race to slide onto said bearing receiving surface of said shaft, said inner race also includes a plurality of non-helical grooves formed on said outer race assembly, said inner race is smaller in diameter than said outer race assembly thereby forming a circular raceway between said non-helical grooves formed on said outer race assembly and said non-helical grooves formed on said inner race; and
   e. a plurality of rollers disposed in said circular raceway formed between said outer race assembly and said inner race, each said roller includes a plurality of non-helical teeth configured to simultaneously engage the plurality of said non-helical grooves on said outer race assembly and the plurality of said non-helical grooves inner race, said rollers being mounted on a rotating spacing structure that prevents longitudinal movement of said rollers and maintains said rollers in an evenly spaced apart position around said inner race and inside said outer race, said rotating spacing structure is a pair of alignment rings that fit into compatible grooves formed on said outer race assembly, said alignment rings able to rotate inside said outer race assembly and said rollers extending between said alignment rings and able to rotate freely; and
   f. a lock nut attached to said threaded stem to hold said inner race in place on said shaft.

9. A shaft mounted, high load capacity bearing, comprising:
   a. a cylindrical outer sleeve made up of two longitudinally aligned outer sleeve sections separated by a gap, each said outer sleeve sections includes an inner bore;
   b. a shaft longitudinally aligned and extending through said inner bore on said outer sleeve, said shaft includes an abutment edge, a smooth bearing receiving section, and a threaded stem;
   c. a cylindrical outer race located inside said inner bore formed by said outer sleeve sections and around said shaft, said outer race being made of at least two split ring components that include a plurality of inward facing, non-helical grooves that when said split ring components are joined to form a cylindrical outer race with a plurality of non-helical, circumferential grooves formed thereon, said outer race include an outward extend collar that fits into said gap formed between said outer sleeve sections;
   d. a cylindrical inner race located inside said outer race and adjacent to said shaft, said inner race includes an inner bore that enables said inner race to slide onto said bearing receiving surface of said shaft, said inner race also includes a plurality of non-helical grooves that are aligned with said non-helical grooves formed on said outer race assembly, said inner race is smaller in diameter than said outer race assembly thereby forming a circular raceway between said non-helical grooves formed on said outer race assembly and said non-helical grooves formed on said inner race;
   e. a plurality of rollers disposed in said circular raceway formed between said outer race assembly and said inner race, each said roller includes a plurality of non-helical teeth configured to simultaneously engage the plurality of said non-helical grooves on said outer race assembly and the plurality of said non-helical grooves inner race, said rollers being mounted on a rotating spacing structure that prevents longitudinal movement of said rollers and maintains said rollers in an evenly spaced apart position around said inner race and inside said outer race, said rotating spacing structure is a rotating cylindrical cage located inside said outer sleeve assembly with a plurality of said rollers longitudinally aligned and mounted thereon, said cage able to rotate freely inside said outer sleeve assembly and each said roller is able to rotate freely on said cylindrical cage, and, f. a lock nut attached to said threaded stem to hold said inner race in place on said shaft.

* * * * *